US010743327B2

(12) United States Patent
Zhao et al.

(10) Patent No.: US 10,743,327 B2
(45) Date of Patent: Aug. 11, 2020

(54) RADIO RESOURCE MANAGEMENT SYSTEM AND RADIO RESOURCE MANAGEMENT METHOD

(71) Applicant: SONY CORPORATION, Tokyo (JP)

(72) Inventors: Youping Zhao, Beijing (CN); Chen Sun, Beijing (CN); Songpeng Li, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 15/525,861

(22) PCT Filed: Nov. 13, 2015

(86) PCT No.: PCT/CN2015/094566
§ 371 (c)(1),
(2) Date: May 10, 2017

(87) PCT Pub. No.: WO2016/074643
PCT Pub. Date: May 19, 2016

(65) Prior Publication Data
US 2017/0339705 A1 Nov. 23, 2017

(30) Foreign Application Priority Data
Nov. 14, 2014 (CN) .......................... 2014 1 0646214

(51) Int. Cl.
*H04W 72/10* (2009.01)
*H04W 16/14* (2009.01)
(Continued)

(52) U.S. Cl.
CPC ........... *H04W 72/10* (2013.01); *H04L 5/0073* (2013.01); *H04W 16/14* (2013.01); *H04W 72/082* (2013.01)

(58) Field of Classification Search
CPC combination set(s) only.
See application file for complete search history.

(56) References Cited

U.S. PATENT DOCUMENTS

| 8,958,806 | B2 | 2/2015 | Kulkarni |
| 2011/0294514 | A1 | 12/2011 | Kulkarni |
| (Continued) | | | |

FOREIGN PATENT DOCUMENTS

| CN | 102811492 A | 12/2012 |
| CN | 104105141 A | 10/2014 |
| GB | 2480692 B | 6/2013 |

OTHER PUBLICATIONS

Fujii et al., "Spectrum Sharing by Adaptive Transmit Power Control for Low Priority Systems and its Achievable Capacity", 2008, Research Laboratories, NTT DoCoMo, Inc. (Year: 2008).*
(Continued)

*Primary Examiner* — Justin T Van Roie
(74) *Attorney, Agent, or Firm* — Xsensus LLP

(57) ABSTRACT

A radio resource management system and method, the system includes: an acquisition device acquiring a range to be protected of a high priority system and a positioning range of a low priority system based on position information about at least one high priority system and at least one low priority system; a selection device selecting, with regard to the high priority system in at least one high priority system group, a position where a reference generated by a low priority system to the high priority system satisfies a predetermined condition, for each low priority system within the positioning range thereof, as a reference position of the low priority system based on the range to be protected of the high priority system; and a parameter determination device determining a working parameter of the low priority system for the high priority system based on the reference position of each low priority system.

16 Claims, 8 Drawing Sheets

(51) Int. Cl.
 H04W 72/08 (2009.01)
 H04L 5/00 (2006.01)

(56) References Cited

U.S. PATENT DOCUMENTS

2013/0343219 A1* 12/2013 Kronander .......... H04W 52/243
                                                    370/252
2015/0373554 A1* 12/2015 Freda .................... H04L 5/0064
                                                    455/450
2015/0382199 A1* 12/2015 Sun ....................... H04W 16/10
                                                    455/447

OTHER PUBLICATIONS

Cho et al., "Partitioning Resource Priority Regions for Hybrid Access Mode Femtocells", 2012, IEEE, ETRI (Year: 2012).*
International Search Report dated Feb. 18, 2016 in PCT/CN2015/094566.

* cited by examiner

RADIO RESOURCE MANAGEMENT SYSTEM AND RADIO RESOURCE MANAGEMENT METHOD

FIELD OF THE INVENTION

The present disclosure relates to the management of radio resource in wireless communication, and in particular to a radio resource management system and method that manage the use of radio resource by a low priority system having a relatively low priority in a communication system without causing interference to a high priority system having a relatively high priority in the communication system.

BACKGROUND OF THE INVENTION

With the development of wireless communication technology, radio resource is becoming more and more insufficient. To sufficiently utilize limited radio resource, for example radio resource having been allocated to some services but having not been sufficiently utilized may be dynamically utilized. More particularly, for a primary system having a right to use radio resource, radio resource having not been sufficiently utilized by the primary system may be allocated to un-licensed high priority secondary system and low priority secondary system without influencing the use by the primary system, such that the secondary systems may properly use licensed radio resource of the primary system without influencing the use of radio resource by the primary system.

However, how to more efficiently allocate spectrum resource to a low priority system without influencing the use of spectrum resource by a high priority system including a primary system is a technical problem desired to be solved in the field.

SUMMARY OF THE INVENTION

A brief summary of the present disclosure is given below to provide a basic understanding to some aspects of the present disclosure. It should be understood that the summary is not exhaustive; it does not intend to define a key or important part of the present disclosure, nor does it intend to limit the scope of the present disclosure. The object of the summary is only to present some concepts, in a simplified manner, as a preamble of the more detailed description that follows.

In view of the foregoing deficiency of the prior art, one object of the present disclosure is to provide a radio resource management system, comprising: an acquisition device, configured to acquire the range to be protected of at least one high priority system managed by the radio resource management system and acquire the locating range of at least one low priority system managed by the radio resource management system based on the location information of the at least one high priority system and the location information of the at least one low priority system, wherein, the high priority system has a higher priority than the low priority system with regard to the use of spectrum resource, and the low priority system opportunistically utilizes the spectrum resource; a selection device, configured to select, with respect to each high priority system among the at least one high priority system, the location in which the interference generated on the high priority system satisfies a predetermined condition for each low priority system in the locating range thereof based on the range to be protected of the high priority system, as the reference location of the low priority system; and a parameter determination device, configured to determine the operational parameter of the low priority system for the high priority system based on the reference location of each low priority system.

According to another embodiment of the present disclosure, there is further provided a radio resource management system, comprising: a communication device, configured to send the location information of the low priority system managed by the radio resource management system to the neighbor radio resource management system and receive the operational parameter for the low priority system managed by the radio resource management system from the neighbor radio resource management system; and a parameter configuration device, configured to configure the current operational parameter of the corresponding low priority system managed by the radio resource management system as the operational parameter, wherein, the neighbor radio resource management system selects, with respect to each high priority system managed by the neighbor radio resource management system, the reference location for each low priority system within the uncertain range thereof based on the received location information of the low priority system managed by the radio resource management system, and determine the adjustment to the operational parameter of the low priority system based on the reference location of each low priority system, such that the use of the spectrum resource by the low priority system satisfies the interference requirement of the high priority system.

According to yet another embodiment of the present disclosure, there is further provided a radio resource management method for a radio resource management system, comprising: acquiring the range to be protected of at least one high priority system managed by the radio resource management system and acquiring the locating range of at least one low priority system managed by the radio resource management system based on the location information of the at least one high priority system and the location information of the at least one low priority system, wherein, the high priority system has a higher priority than the low priority system with regard to the use of spectrum resource, and the low priority system opportunistically utilizes the spectrum resource; selecting, with respect to each high priority system among the at least one high priority system, the location in which the interference generated on the high priority system satisfies a predetermined condition for each low priority system in the locating range thereof based on the range to be protected of the high priority system, as the reference location of the low priority system; and determining the operational parameter of the low priority system for the high priority system based on the reference location of each low priority system.

In addition, according to an embodiment of the present disclosure, there is further provided an electronic device, comprising a processing circuit or one/more processor(s) configured to: acquire the range to be protected of at least one high priority system managed by the radio resource management system and acquire the locating range of at least one low priority system managed by the radio resource management system based on the location information of the at least one high priority system and the location information of the at least one low priority system, wherein, the high priority system has a higher priority than the low priority system with regard to the use of spectrum resource, and the low priority system opportunistically utilizes the spectrum resource; select, with respect to each high priority system among the at least one high priority system, the location in which the interference generated on the high priority system satisfies a predetermined condition for each low priority system in the locating range thereof based on the range to be protected of the high priority system, as the reference location of the low priority system; and determine the operational parameter of the low priority system for the high priority system based on the reference location of each low priority system.

Besides, an embodiment of the present disclosure further provides a computer program for realizing the above radio resource management method.

In addition, an embodiment of the present disclosure further provides a corresponding computer-readable storage medium storing thereon a computer program code for realizing the above radio resource management method.

The radio resource management system and method according to the embodiments of the present disclosure at least can produce the advantageous effect of: making it possible to greatly reduce a calculation amount when determining the operational parameter for each low priority system.

By describing preferred embodiments of the present invention in detail in combination with the appended drawings below, the above and other advantages of the present invention will become more apparent.

BRIEF DESCRIPTION OF THE DRAWINGS

The present disclosure can be better understood with reference to the descriptions made in combination with the appended drawings hereinafter, wherein identical or similar components are denoted by identical or similar reference signs throughout the appended drawings. The appended drawings together with the detailed descriptions below are included in the specification and constitute a part of the specification, and are used to further describe the preferred embodiments of the present disclosure and explain the principles and advantages of the present disclosure by way of examples. In the appended Drawings.

Those skilled in the art should understand that elements in the appended drawings are shown only for the sake of briefness and clarity but are not necessarily scaled. For example, sizes of some elements in the appended drawings may be enlarged with respect to other elements, so as to facilitate improvements in the understanding to the embodiments of the present disclosure.

DETAILED DESCRIPTION OF THE INVENTION

Exemplary embodiments of the present disclosure will be described combined with the appended drawings below. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

The present disclosure proposes a radio resource management system and method for allocating spectrum resource to a low priority user while ensuring the communication quality of a high priority user to be free of interference by the low priority user.

Figure 1:
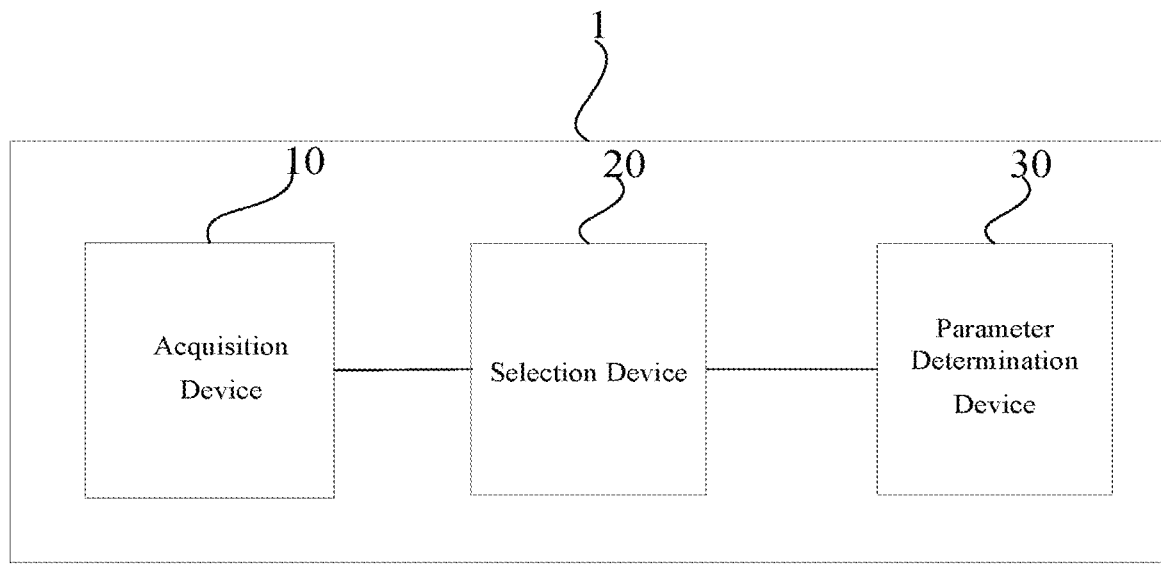
FIG. 1 is an exemplary structural block diagram schematically showing a radio resource management system according to one embodiment of the present disclosure.

FIG. 1 is an exemplary structural block diagram schematically showing a radio resource management system according to one embodiment of the present disclosure.

As shown in FIG. 1, a radio resource management system 1 comprises: an acquisition device 10, configured to acquire the range to be protected of at least one high priority system managed by the radio resource management system and acquire the locating range of at least one low priority system managed by the radio resource management system based on the location information of the at least one high priority system and the location information of the at least one low priority system, wherein, the high priority system has a higher priority than the low priority system with regard to the use of spectrum resource, and the low priority system opportunistically utilizes the spectrum resource; a selection device 20, configured to select, with respect to each high priority system among the at least one high priority system, the location in which the interference generated on the high priority system satisfies a predetermined condition for each low priority system in the locating range thereof based on the range to be protected of the high priority system, as the reference location of the low priority system; and a parameter determination device 30, configured to determine the operational parameter of the low priority system for the high priority system based on the reference location of each low priority system.

According to one embodiment of the present disclosure, the high priority system managed by the radio resource management system 1 may be the primary system that has a normal use right of the spectrum resource, which generally includes a primary base station and a primary user; the low priority system may be the secondary system that is not granted a use right of the spectrum resource but opportunistically utilizes the spectrum resource, which generally includes a secondary base station and a secondary user. For example, the high priority system of the radio resource management system 1 for example may be a terrestrial television broadcast system and a radar system, and the low priority system for example may be a resource reconfigurable system (RRS) proposed by ETSI organization, e.g. a WiFi communication system using a television or radar frequency band; also for example, the high priority system may be a WiFi communication system, and the low priority system may be a cellular mobile communication system using Licensed Assisted Access (LAA) technique which is proposed in the LET evolution standard of 3GPP, so as to utilize WiFi frequency band resource.

According to another embodiment of the present disclosure, the high priority system may also be the high priority secondary system that opportunistically utilizes the spectrum resource while ensuring the use of spectrum by the primary system; and the low priority system may be the secondary system that has a lower priority than the high priority system with regard to the use of spectrum resource. For example, the high priority system may be a radio communication system that for example is applied to scenarios such as hospitals, first-aid centers and so on, and the low priority system may be a radio communication system applied to common scenarios.

According to an embodiment of the present disclosure, the high priority secondary system and the low priority secondary system may include for example a secondary user and a secondary base station, and may also include a secondary user only (for example, a case of a secondary user directly managed by the radio resource management system, with no secondary base station being arranged). Therefore, in the descriptions of the present disclosure, the secondary user is referred to as a secondary system in broad sense to cover the above case.

More particularly, specific embodiments of the high priority secondary system and the low priority secondary system according to the present disclosure for example may be mobile terminals (such as intelligent phones, tablet PCs, notebook PCs, portable game terminals, portable/softdog type mobile routers and digital photographing devices) or in-vehicle terminals (such as automobile navigation devices), and may also be terminals that implement machine-to-machine (M2M) communication (also referred to as machine type communication (MTC) terminals) or terminals that implement device-to-device (D2D) communication.

According to the present disclosure, the basic principle of allocating spectrum resource to the low priority system for use by the low priority system is first ensuring the low priority system not to interfere with the use of spectrum resource by the high priority system with regard to the use of spectrum resource.

According to the present disclosure, the radio resource management system 1 may be a geographical location information database (GLDB) in for example an RRS for managing information on a communication system (including a high priority system and a low priority system) within a particular range, may also be an advanced locating engine (AGE) that covers a communication system within a particular rage, and may also be a network side apparatus such as baseband cloud and so on in the architecture of for example eNodeB or for example C-RAN. In addition, the radio resource management system 1 may be a separate entity independent of the high priority system and the low priority system, and may also be a combination of a plurality of entities distributed on respective high priority systems and low priority systems.

The radio resource management system 1 according to the present disclosure is used for managing the low priority system within its management range, such that the low priority system opportunistically utilizes the spectrum resource, e.g. the licensed spectrum resource of the primary system, under the premise that the interference to the high priority system satisfies a predetermined condition.

According to the present disclosure, opportunistically utilizing the spectrum resource means causing both the high priority secondary system and the low priority secondary system or the low priority system to use the spectrum resource in a case where no influence is produced upon the use of the spectrum resource by the primary system or the primary system and the high priority secondary system (including a case where the interference to the use of the spectrum resource by the primary system is within an allowable range of the primary system); if the influence produced by the use of the spectrum resource by both the high priority secondary system and the low priority secondary system or the low priority system upon the primary system is beyond the allowable range of the primary system, both the high priority secondary system and the low priority secondary system or the low priority system are prohibited from using the spectrum resource.

Figure 2:
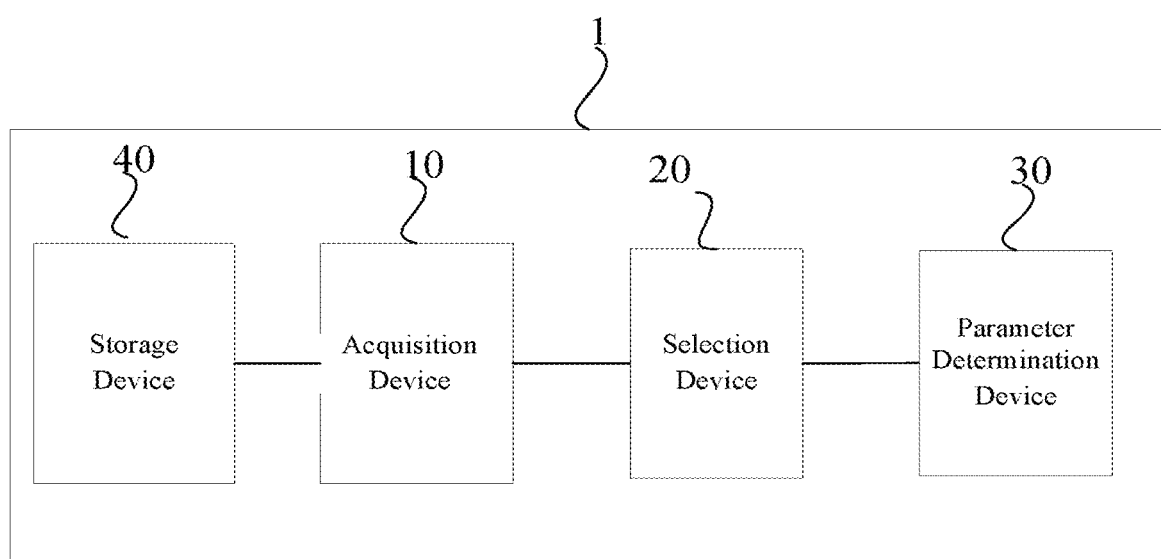
FIG. 2 is another exemplary structural block diagram schematically showing a radio resource management system according to the present disclosure.

FIG. 2 is another exemplary structural block diagram schematically showing a radio resource management system according to the present disclosure.

As shown in FIG. 2, besides the acquisition device 10, the selection device 20 and the parameter determination device 30 that are similarly comprised in the radio resource management device 1 in FIG. 1, a radio resource management device 2 further comprises: a storage device 40 configured to store geographical location information of the at least one high priority system and the at least one low priority system, wherein, the acquisition device 10 is further configured to access the storage device 40 to acquire geographical location information of the at least one secondary system and the at least one primary system.

In general, the location information and service boundary information of the primary system may be stored in the storage device 40 of the radio resource management system, and a locating device such as a GPS (Global Positioning System) may report location information and a locating parameter (locating error) to the secondary systems, such that the radio resource management system may acquire from the respective secondary systems the location information thereof and the locating parameter and store them in the storage device 40. However, since there would be uncertainty for the locating by the locating device such as the GPS and so on (for example there would be an error of the locating by the locating device) and/or the locations of the secondary systems would be changed due to movements, a predetermined location range generally shall be determined, based on the locations of the secondary systems that are reported by the locating device, as a set of locations where the high priority secondary system and the low priority secondary system possibly appear. In the following descriptions of the present disclosure, the range of locations where the high priority secondary system possibly appears will be referred to as the range to be protected of the high priority secondary system (or the high priority system), and the range of locations where the low priority system possibly appears will be referred to as the locating range of the low priority system. In addition, the primary system has a predetermined service area, the interference to the primary system generally refers to the interference to the service area of the primary system, and the area will be referred to as the range to be protected of the primary system (or the high priority system) hereinafter.

The acquisition device 10 may acquire the range to be protected by the high priority system and the locating range of the low priority system based on the location information of each of the high priority system and the low priority system. For example, the acquisition device may acquire from the respective secondary systems the location information and the locating parameter (locating error) of the locating device that are reported by the locating device, thereby acquiring a circular range that takes the location reported by the locating device as a center point and takes the locating parameter (e.g. 50 meters) as a radius, as a set of locations where the high priority system and the low priority system possibly appear, i.e. the range to be protected of the high priority system and the locating range of the low priority system.

The selection device 20 may select, with respect to each of the at least one high priority system managed by the radio resource management system 1, the location in which the interference generated on the high priority system satisfies a predetermined condition for each low priority system in the locating range thereof based on the range to be protected of the high priority system that is acquired by the acquisition device, as the reference location of the low priority system.

The high priority system to be protected shall be free of the interference by the low priority system, so the following shall be considered when determining the operational parameter for the low priority system with regard to the use of spectrum by the low priority system: causing the interference not to be generated on the high priority system to be protected at all the locations where the low priority system possibly appears within the locating range of the low priority system (or causing the generated interference to be within a threshold range of the interference to the high priority system). According to the present disclosure, to reduce a calculation amount, for example, the selection device 20 may select in the locating range of the low priority system at least one location where the interference generated on the high priority system is maximum, as the reference location of the low priority system, i.e. as the location of the low priority system to calculate the operational parameter of the low priority system when using the spectrum resource.

According to a preferred embodiment of the present disclosure, the selection device 20 may be configured to determine, with respect to each high priority system, the reference location of each low priority system based on at least one of the distances and path losses between respective low priority systems and the high priority system, and the environmental factors in relation to the environment that the radio resource management system is located in.

For example, the location within the locating range of the low priority system that has the minimum path loss to the high priority system may be regarded as the location where the maximum interference is generated on the high priority system. Thus the selection device 20 may select in the locating range of the low priority system the location that has the minimum path loss to the high priority system as the reference location of the low priority system. Also for example, the location within the locating range of the low priority system that is the nearest to the high priority system generally may be regarded as the location where the maximum interference is generated on the high priority system. Thus the selection device 20 for example may select in the locating range of the low priority system the location that is the nearest to the high priority system as the reference location of the low priority system.

In addition, the selection device 20 may also determine the reference location of each low priority system based on the environment that the at least one high priority system and the at least one low priority system are located in. The environment that the at least one high priority system and the at least one low priority system are located in for example includes environmental factors such as application scenarios, terrains, topographic features and so on.

Figure 3:
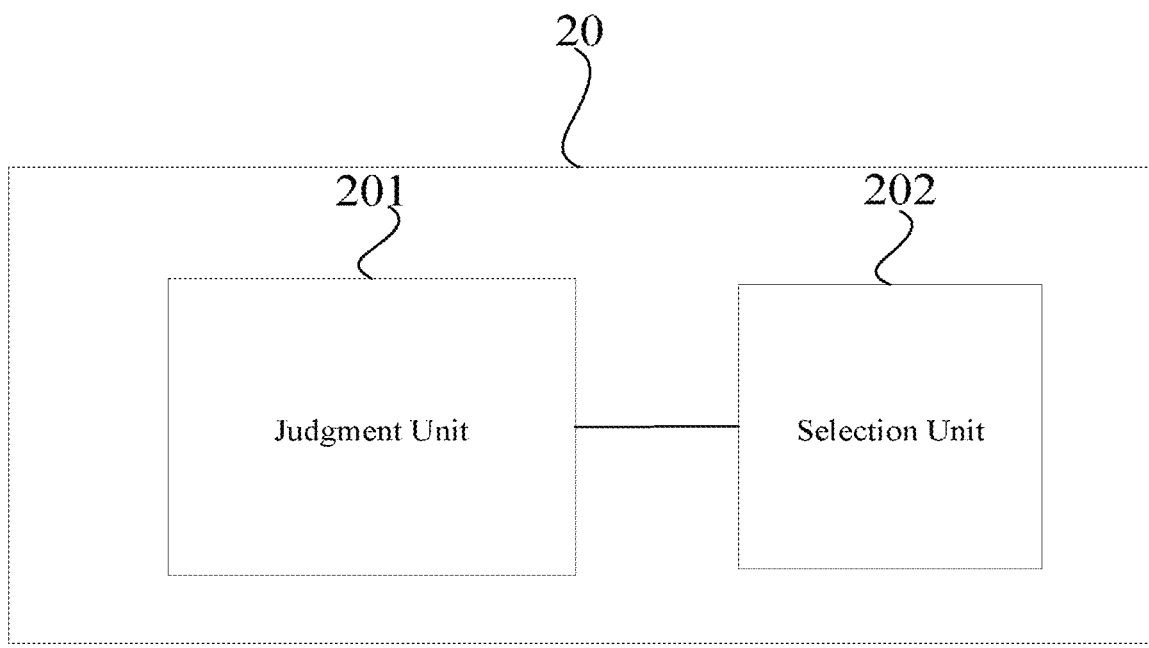
FIG. 3 is a block diagram schematically showing one possible exemplary structure of a selection device as shown in FIG. 1.

FIG. 3 is a block diagram schematically showing one possible exemplary structure of the selection device as shown in FIG. 1.

As shown in FIG. 3, the selection device 20 comprises: a judgment unit 201, configured to judge, with respect to each high priority system, whether there is an obstruction between the locating range of respective low priority systems and the range to be protected of the high priority system or not; and a selection unit 202, configured to select the reference location of the low priority system based on whether there is an obstruction and whether there is an overlapping between the locating range of respective low priority systems and the range to be protected of the high priority system or not.

According to the present disclosure, the environmental information of the at least one high priority system and the at least one low priority system may be acquired by the acquisition device 10 from for example a geographical location information system (GIS). The geographical location information system may be located within the radio resource management system 1, or may also be an individual device independent of the radio resource management system 1. The judgment unit 201 may judge, with respect to each high priority system, whether there is an obstruction between the locating range of respective low priority systems and the range to be protected of the high priority system or not, according to the environmental information acquired by the acquisition device (in this text, the obstruction does not refer to all objects located between the high and low priority systems, but refers to objects obstructing a visual range, such as buildings). For example, the judgment unit may determine whether there is an obstruction between the locating range of the low priority systems and the range to be protected of the high priority system or not, based on whether there is a line-of-sight between an antenna of the low priority systems and an antenna of the high priority system or not (for example between the locating range of antennas of base stations of the low priority systems and the range to be protected of an antenna of a base station of the high priority system).

According to the present disclosure, the judgment unit 201 may judge, based on antenna heights of the high priority system and the low priority system and a height between buildings, whether there is an obstruction between the locating range of the low priority systems and the range to be protected of the high priority system or not. For example, the judgment unit 201 may determine, based on whether a gap between a connection line between an antenna vertex of the high priority system and an antenna vertex of the low priority systems and an object located between the high and low priority systems crosses for example a Phynier region or not, whether the object constitutes an obstruction between the locating range of the low priority systems and the range to be protected of the high priority system or not.

The selection unit 202 selects in the locating range of the low priority system the reference location of the low priority system based on obstruction and overlapping cases between the locating range of the low priority system and the range to be protected of the high priority system.

Particularly, the selection unit 202 selects, with respect to each high priority system, the reference location for each low priority system based on one of the following way:

(i) when there is no obstruction and overlapping between the locating range of the low priority system and the range to be protected of the high priority system or when the region between the locating range of the low priority system and the range to be protected of the high priority system is totally sheltered by an obstruction, selecting on the boundary of the locating range of the low priority system the location that is nearest to the boundary of the range to be protected of the high priority system as the reference location of the low priority system;

(ii) when the region between the locating range of the low priority system and the range to be protected of the high priority system is partly sheltered by an obstruction and there is no overlapping therebetween, selecting in the locating range of the low priority system the location that is in line of sight with arbitrary point within the range to be protected of the high priority system and is nearest to the arbitrary point as the reference location of the low priority system;

(iii) when the region between the locating range of the low priority system and the range to be protected of the high priority system is partly sheltered by an obstruction and there is an overlapping therebetween, if the sheltered portion can totally cover the overlapped part, selecting in the locating range of the low priority system the location that is in line of sight with arbitrary location within the range to be protected of the high priority system and is nearest to the arbitrary location as the reference location of the low priority system;

(iv) when there is no obstruction between the locating range of the low priority system and the range to be protected of the high priority system and there is an overlapping therebetween or when the region between the locating range of the low priority system and the range to be protected of the high priority system is partly sheltered by an obstruction and there is an overlapping therebetween and the sheltered portion cannot totally cover the overlapped part, determining that the reference location of the low priority system is overlapped with the location of the high priority system.

Hereinafter, processing of selecting the reference location for the low priority system by the selection unit 202 in various application scenarios will be described in detail in combination with FIG. 4(a) and FIG. 4(b).

Figure 4A:
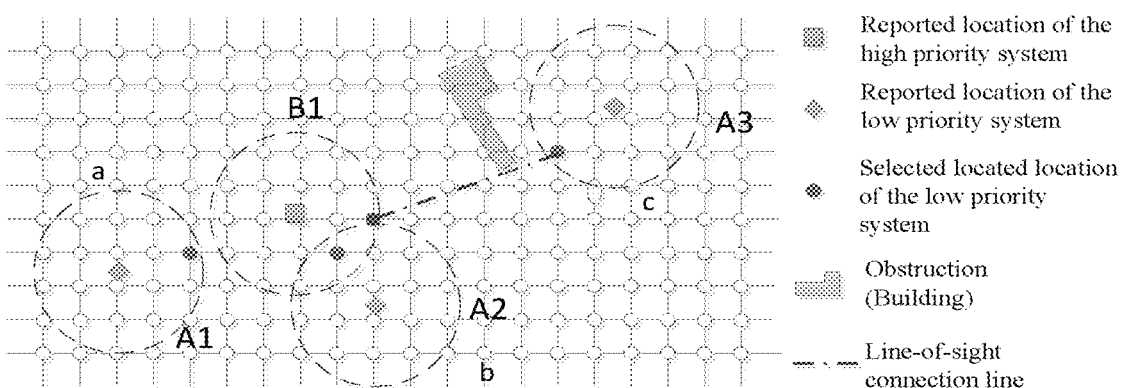
FIG. 4(*a*) and FIG. 4(*b*) are schematic views showing examples of application scenarios of a high priority system and a low priority system.
Figure 4B:
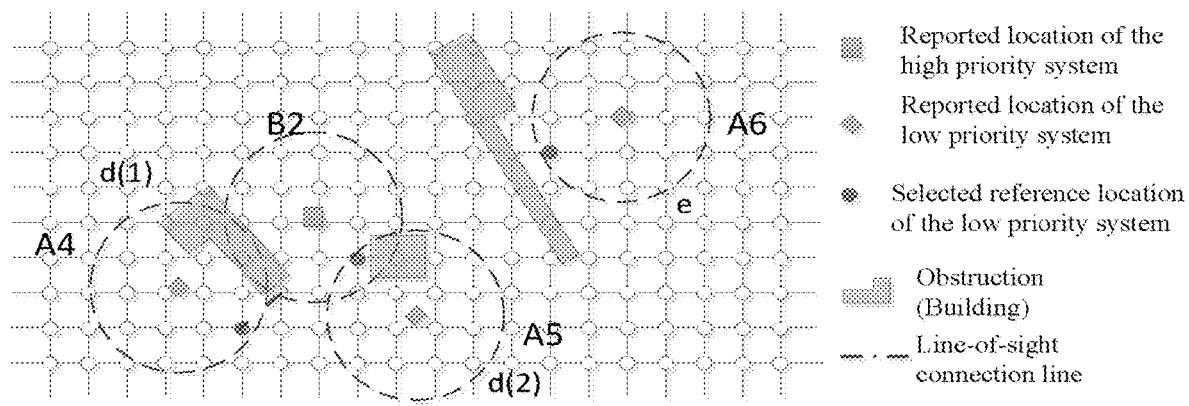

More particularly, when selecting the reference location for each low priority system with respect to each high priority system, if the judgment unit 201 judges that there is no obstruction and overlapping between the locating range of the low priority system and the range to be protected of the high priority system (as shown by the scenario a in FIG. 4(a)) based on the environmental information of the high priority system and the low priority system that are acquired by the acquisition device 10, the selection unit 202 may select, in the locating range of the low priority system, on the boundary of the locating range of the low priority system the location that is nearest to the boundary of the range to be protected of the high priority system as the reference location of the low priority system. However, the present disclosure is not limited hereinto. According to another embodiment of the present disclosure, the selection unit 202 may also select in the locating range of the low priority system the point that has the minimum path loss to the high priority system as the reference location of the low priority system.

When the judgment unit 201 judges that there is no obstruction between the locating range of the low priority system and the range to be protected of the high priority system and there is an overlapping therebetween (as shown by the scenario b in FIG. 4(a)) based on the environmental information of the high priority system and the low priority system that are acquired by the acquisition device 10, this generally indicates a high probability that the location of the low priority system is overlapped with the location of the high priority system, so the selection unit 202 may determine that the reference location of the low priority system is overlapped with the location of the high priority system.

When the judgment unit 201 judges that the region between the locating range of the low priority system and the range to be protected of the high priority system is partly sheltered and there is no overlapping therebetween (as shown by the scenario c in FIG. 4(a)) based on the environmental information of the high priority system and the low priority system that are acquired by the acquisition device 10, the selection unit 202 may select in the locating range of the low priority system the location that is in line of sight with arbitrary point within the range to be protected of the high priority system and is nearest to the arbitrary point as the reference location of the low priority system. However, the present disclosure is not limited hereinto. According to another embodiment of the present disclosure, the selection unit 202 may also select in the locating range of the low priority system the point that is in line of sight with arbitrary location within the range to be protected of the high priority system and has a minimum path loss to the arbitrary location as the reference location of the low priority system.

According to the present disclosure, the judgment unit 201 may determine whether respective locations in the locating range of the low priority system are in (Line-of-Sight (LOS)), with arbitrary location within the range to be protected of the high priority system or not, i.e. whether the region between an antenna vertex of the high priority system and an antenna vertex of the low priority system is sheltered or not, based on antenna heights of the high priority system and the low priority system.

When the judgment unit 201 judges that the region between the locating range of the low priority system and the range to be protected of the high priority system is partly sheltered and there is an overlapping therebetween based on the environmental information of the high priority system and the low priority system that are acquired by the acquisition device 10:

(1) if the sheltered portion can totally cover the overlapped portion (as shown by the scenario d(1) in FIG. 4(*b*)), similarly to the scenario c in FIG. 4(*a*), the selection unit 202 may select in the locating range of the low priority system the location that is in line of sight with arbitrary location within the range to be protected of the high priority system and is nearest to the arbitrary location as the reference location of the low priority system; similarly to the scenario c in FIG. 4(*a*), according to another embodiment of the present disclosure, the selection unit 202 may also select in the locating range of the low priority system the point that is in line of sight with arbitrary location within the range to be protected of the high priority system and has a minimum path loss to the arbitrary location as the reference location of the low priority system;

(2) if the sheltered portion cannot totally cover the overlapped portion (as shown by the scenario d(2) in FIG. 4(*b*)), this indicates a high probability that the location of the low priority system is overlapped with the location of the high priority system (similar to the scenario b in FIG. 4(*a*)), so the selection unit 202 may determine that the reference location of the low priority system is overlapped with the location of the high priority system, such that the parameter adjustment device 30 may determine on this basis that the transmission power of the low priority system is zero, that is, determine that the low priority system is prohibited from transmission.

When the judgment unit 201 judges that the region between the locating range of the low priority system and the range to be protected of the high priority system is totally sheltered by an obstruction (as shown by the scenario e in FIG. 4(*b*)) based on the environmental information of the high priority system and the low priority system that are acquired by the acquisition device 10, similarly to the scenario a in FIG. 4(*a*), the selection unit 202 may select, in the locating range of the low priority system, on the boundary of the locating range of the low priority system the location that is nearest to the boundary of the range to be protected of the high priority system as the reference location of the low priority system. Similarly to the scenario a in FIG. 4(*a*), according to another embodiment of the present disclosure, the selection unit 202 may also select in the locating range of the low priority system the point that has a minimum path loss to the high priority system as the reference location of the low priority system.

The parameter determination device 30 determines the operational parameter of the low priority system for the high priority system based on the reference location of each low priority system.

According to the present disclosure, the operational parameter of the low priority system that is determined by the parameter determination device 30 may be the maximum transmission power, operating channel and the like of the low priority system.

According to one embodiment of the present disclosure, in a case where the selection unit 202 determines that the reference location of the low priority system is overlapped with the location of the high priority system, the parameter adjustment device 30 may determine that the transmission power of the low priority system is zero, that is, determine that the low priority system is prohibited from transmission. However, the present disclosure is not limited hereto. As would be understood by those skilled in the art, when the radio resource management system 1 may acquire or perceive the information on the spectrum use period of the high priority system, the low priority system may also be set to use the spectrum resource when the high priority system does not use the spectrum resource.

According to an embodiment of the present disclosure, the parameter determination device 30 is configured to determine, with respect to each high priority system of at least one high priority system, the operational parameter of each low priority system based on the reference location of each low priority system, and select the minimum transmission power from at least one operational parameter determined for each low priority system with respect to at least one high priority system, as the transmission power of the low priority system.

Particularly, in a case where there are two or more high priority system managed by the radio resource management system 1, the parameter determination device 30 may determine, with respect to each high priority system, operational parameters for respective low priority systems, so as to determine a set of operational parameters for each low priority system (each operational parameter in the set of operational parameters corresponds to one high priority system; for example, when there are two high priority system managed by the radio resource management system, the set of operational parameters of each low priority system includes two operational parameters). The parameter determination device 30 for example may select, in the set of operational parameters determined for each low priority system, an operational parameter that generates the minimum interference on respective high priority systems, as the operational parameter of the low priority system, such that each low priority system would not generate interference on the respective high priority systems (or the generated interference is within a tolerable range of the high priority systems) when using the spectrum resource with this operational parameter.

The parameter determination device 30 for example may calculate the aggregate interference generated by all the low priority systems on the high priority system based on the reference location of the low priority system, so as to determine operational parameters that can be used by respective low priority systems to ensure the interference on the high priority system to be within its tolerable range based on the aggregate interference.

According to one embodiment of the present disclosure, in a case where the high priority system is the primary system that has a normal use right of the spectrum resource and the low priority system is the secondary system that opportunistically utilizes the spectrum resource, the parameter determination device may determine the aggregate interference experienced by the primary system based on the reference locations of the secondary systems, and determine the operational parameters of respective low priority systems according to a difference between the aggregate interference and an interference threshold of the primary system (i.e. the maximum interference tolerable by the primary system).

According to another embodiment of the present disclosure, in a case where the high priority system is the high priority secondary system that opportunistically utilizes the spectrum resource of the primary system and the low priority system is the low priority secondary system that opportunistically utilizes the spectrum resource of the primary system and has a lower priority than the high priority secondary system with regard to the use of spectrum resource, the parameter determination device 30 may determine the interference location of the high priority system based on the case of the aggregate interference experienced by the high priority system at respective locations within the range to be protected thereof, so as to determine the operational parameter of the low priority system based on the interference location.

Figure 5:
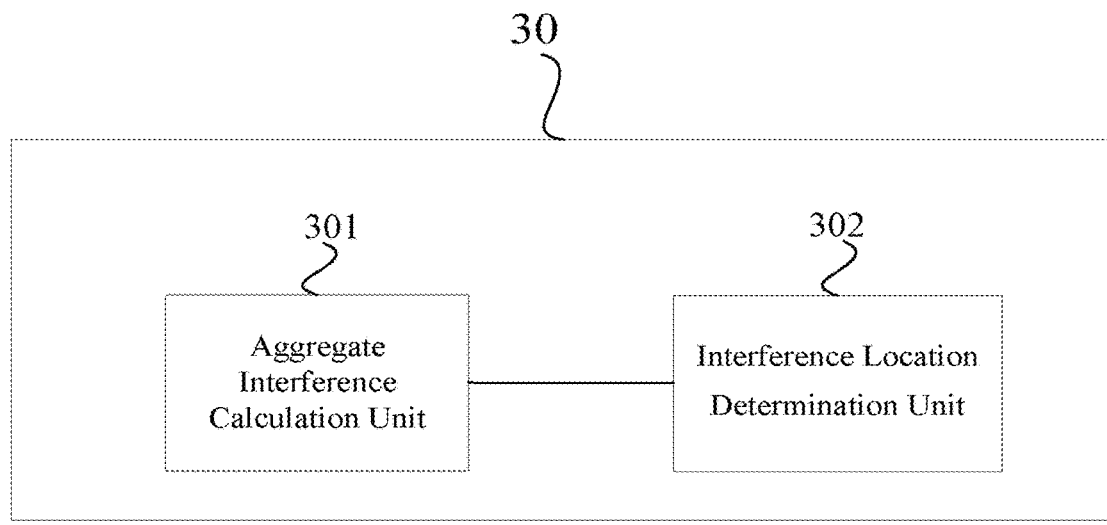
FIG. 5 is a block diagram schematically showing one possible exemplary structure of a parameter determination device as shown in FIG. 1.

FIG. 5 is a block diagram schematically showing one possible exemplary structure of the parameter determination device as shown in FIG. 1.

As shown in FIG. 5, the parameter determination device 30 comprises: an aggregate interference calculation unit 301, configured to calculate, with respect to each high priority secondary system, the aggregate interference experienced by respective locations within the range to be protected of the high priority secondary system based on the reference location of each low priority secondary system determined by the selection unit 202; and an interference location determination unit 302, configured to select the interference location of the high priority secondary system within the range to be protected of the high priority secondary system according to the aggregate interference calculated by the aggregate interference calculation unit 301, so as to determine the operational parameters of respective low priority secondary systems based on the interference location of the high priority secondary system.

According to the present disclosure, the aggregate interference calculation unit 301 calculates the aggregate interference experienced by respective locations within the range to be protected of the high priority secondary system based on the reference location determined by the selection unit 202 for each low priority secondary system. The method for calculating, with respect to each location selected within the range to be protected of the high priority system (for example, within the range to be protected of the high priority secondary system that takes a GPS-located location as a center and takes a predetermined value such as 50 m as a radius, the range to be protected may be segmented into 10 m×10 m rectangular regions, in which locations at grid intersections are used as respective locations selected within the range to be protected of the high priority secondary system), the aggregate interference experienced by the high priority system at the locations based on the locations of respective low priority systems is well-known in the art, and will not be described in detail herein.

According to the present disclosure, the interference location determination unit 302 may select in the range to be protected of the high priority secondary system the location having the maximum aggregate interference as the interference location of the high priority system based on the aggregate interference calculated by the interference calculation unit 301, such that when respective low priority systems operate with the operational parameters determined based on the interference location, the interference generated on the high priority secondary system (within the range to be protected that includes all potential locations thereof) in each case falls within the allowable range of the high priority secondary system.

Figure 6:
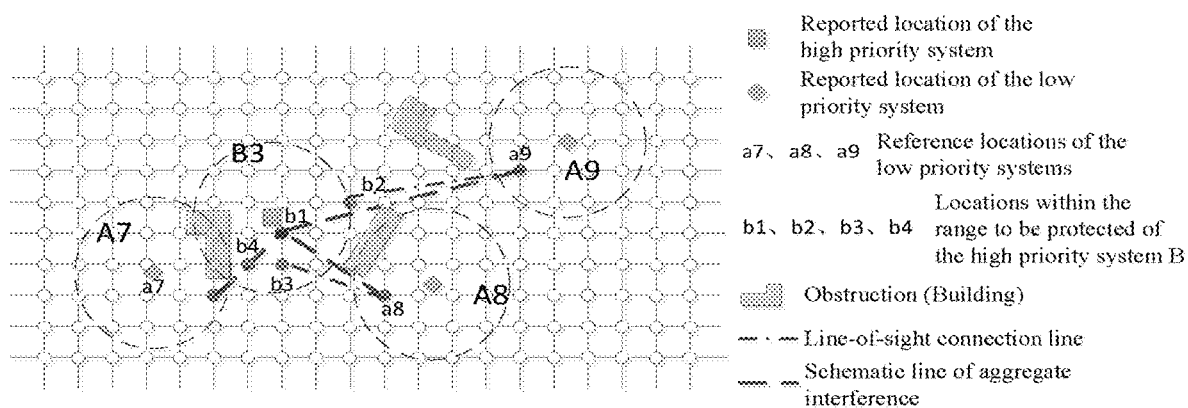
FIG. 6 is a schematic view showing an example of an application scenario of selecting an interference location for a high priority secondary system.

As shown in FIG. 6, after the reference locations a8, a9 and a10 are determined for the low priority systems A7, A8 and A9, the aggregate interference generated by the low priority systems A1, A2 and A3 on the high priority system B is calculated with respect to respective locations (including b1, b2, b3 and b4) within the range to be protected of the high priority system B. When the aggregate interference experienced at the location b1 within the range to be protected of the high priority system B is maximum, the location b1 may be determined to be the interference location of the high priority system B.

After the interference location determination unit 302 determines the interference location for the high priority secondary system, the parameter determination device 30 may determine the operational parameter for the low priority system based on the interference location (e.g., the interference location b1 determined for the high priority system B in FIG. 6).

According to one embodiment of the present disclosure, the parameter adjustment device 30 may uniformly perform regulation for all the low priority systems by a predetermined parameter value (for example reduce the current transmission power of all the low priority systems by a first predetermined parameter value $\Delta$ as new transmission power of the low priority systems), and the predetermined parameter value for example may be determined based on a number N of low priority systems to be regulated and a difference D between the aggregate interference experienced by the high priority system at the interference location and the interference threshold of the high priority system (i.e. the maximum interference value tolerable by the high priority system) (i.e. $\Delta 1 = D/N1$).

According to another embodiment of the present disclosure, the parameter adjustment device 30 may determine regulation amounts of respective low priority secondary systems based on the reference locations of the low priority secondary systems. For example, low priority secondary systems, distances between whose reference locations and the interference location of the high priority secondary system are within a predetermined value range, may be determined first, and regulation by a predetermined parameter value $\Delta 2$ ($\Delta 2$ may be determined based on a number N of low priority secondary systems to be regulated and a difference D between the aggregate interference experienced by the high priority secondary system at the interference location and the interference threshold of the high priority secondary system, i.e. $\Delta 2 = D/N2$) may be performed for these low priority secondary systems. Of course, those skilled in the art would understand that even if the transmission power of all low priority secondary systems whose distances to the high priority secondary system are within a predetermined range is set to be 0, it is insufficient to cause the interference experienced by the high priority secondary system to be below the interference threshold of the high priority secondary system, so the transmission power of other low priority secondary systems than the above low priority secondary systems may be further regulated.

Although the processing of determining the operational parameter for the low priority system is described above with respect to the case where the high priority system is the high priority secondary system and the low priority system is the low priority secondary system, those skilled in the art would understand that similar processing may be performed with respect to the case where the high priority system is the primary system and the low priority system is the secondary system, so as to determine the operational parameter for each secondary system serving as the low priority system, such that the low priority system would not produce influence upon the use of spectrum by the primary system when operating with this operational parameter.

According to another embodiment of the present disclosure, the high priority system may include both the primary system and the high priority secondary system, and the low priority system may be the low priority secondary system. In this case, the parameter determination device 30 is configured to determine the operational parameter of the low priority system based on the reference location of each low priority system, such that the use of the spectrum resource by the low priority system satisfies the interference requirements of both the primary system and the high priority secondary system.

For example, the parameter determination device 30 may sequentially determine, with respect to the primary system and respective high priority secondary systems, the transmission power thereof based on the reference location of each low priority system, and select for example the transmission power that satisfies the interference requirements of the primary system and all the high priority secondary systems as the transmission power of the low priority system. For example, the parameter determination device 30 may select the minimum transmission power among a set of transmission power of the low priority system that is determined with respect to the primary system and respective high priority secondary systems as the transmission power of the low priority system.

In some scenarios, the high priority system managed by the radio resource management device 1 not only experiences interference by the low priority system managed by the radio resource management device 1 but also experiences interference by the low priority system managed by the neighbor radio resource management system. In this case, the low priority system managed by the neighbor radio resource management system shall also be considered in order to ensure the use of spectrum by the high priority system.

Figure 7:
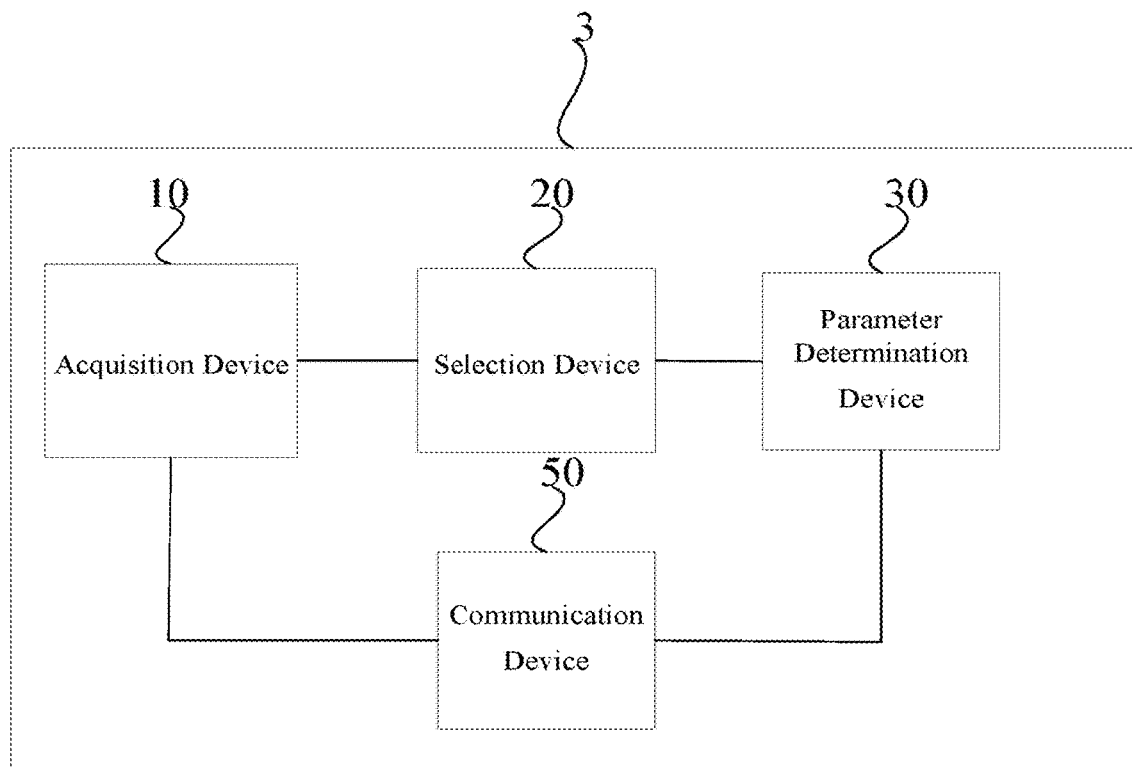
FIG. 7 is a block diagram showing another exemplary structure of a radio resource management system according to an embodiment of the present disclosure.

FIG. 7 is a block diagram showing another exemplary structure of a radio resource management system according to an embodiment of the present disclosure.

As shown in FIG. 7, besides the acquisition device 10, the selection device 20 and the parameter determination device 30 that are similarly comprised in the radio resource management device 1 in FIG. 1, a radio resource management system 3 further comprises a communication device 50, configured to receive the location information of the low priority system managed by the neighbor radio resource management system, and send the determined operational parameter to the neighbor radio resource management system and the low priority system managed by the radio resource management system.

The radio resource management system 3 may store in a storage device (e.g., the storage device 40 as shown in FIG. 2) the location information of the low priority system managed by the neighbor radio resource management system that is received by the communication device 50.

The acquisition device 10 of the radio resource management system 3 may acquire the location information of the neighbor low priority system and the locating range thereof from the storage device, such that the selection means 20 may select, with respect to each high priority system managed by the radio resource management system 3, the reference location for the each neighbor low priority system in the locating range thereof, and the parameter determination device 30 determines the operational parameters of the low priority systems based on the reference locations of respective low priority secondary systems managed by the radio resource management system 3 and respective neighbor low priority systems managed by the neighbor radio resource management system. The processing of selecting the reference location by the selection device for the neighbor low priority system and the processing of determining the operational parameter by the parameter determination device for the low priority system including the neighbor low priority system for example are similar to the processing by the selection means 20 and the parameter determination device 30 as described with reference to FIGS. 1-6, and will not be described repeatedly herein.

Figure 8:
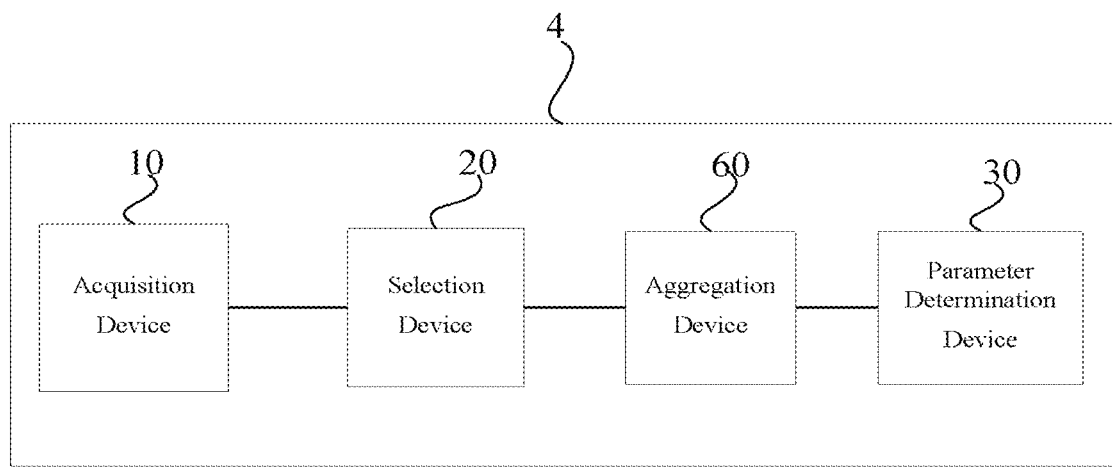
FIG. 8 is a block diagram showing yet another exemplary structure of a radio resource management system according to an embodiment of the present disclosure.

FIG. 8 is a block diagram showing yet another exemplary structure of a radio resource management system according to an embodiment of the present disclosure.

As shown in FIG. 8, besides the acquisition device 10, the selection device 20 and the parameter determination device 30 that are similarly comprised in the radio resource management device 1 in FIG. 1, a radio resource management system 4 further comprises an aggregation device 60, configured to aggregate at least two high priority systems that are managed by the radio resource management system and are geographically close to each other to one high priority secondary system, aggregate at least two low priority systems that are managed by the radio resource management system and are geographically close to each other to one low priority secondary system, and take the overlapping of the ranges to be protected of at least two high priority secondary systems as the range to be protected of the aggregated high priority secondary system (the aggregated high priority secondary system is hereinafter referred to as an equivalent high priority secondary system), take the overlapping of the locating ranges of at least two low priority secondary systems as the locating range of the aggregated low priority secondary system (the aggregated high priority secondary system is hereinafter referred to as an equivalent high priority secondary system).

Figure 9:
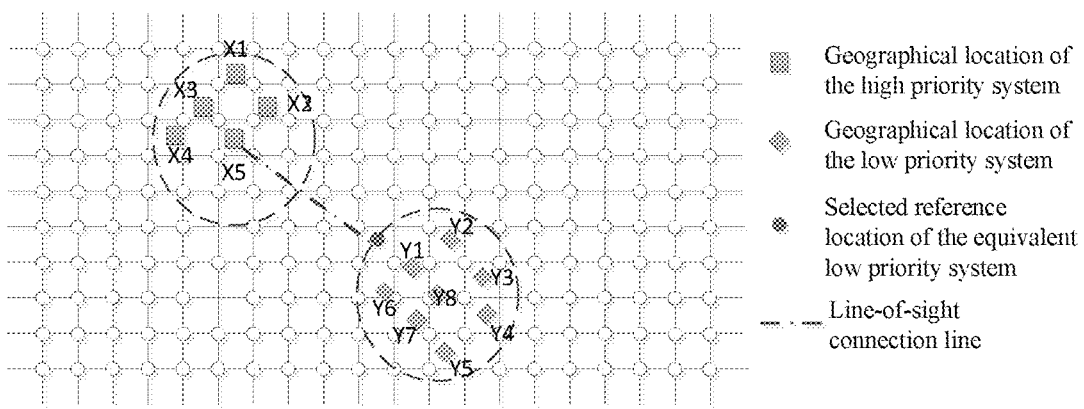
FIG. 9 is a schematic view showing an example of aggregating a plurality of low priority secondary systems and aggregating a plurality of high priority secondary systems.

FIG. 9 shows an example of aggregating a plurality of low priority secondary systems and respectively aggregating a plurality of high priority secondary systems together.

As shown in FIG. 9, a plurality of high priority secondary systems X1, X2, X3, X4, X5 are geographically close to each other, and a plurality of low priority secondary systems Y1, Y2, Y3, Y4, Y5, Y6, Y7 are geographically close to each other, so by the aggregation device 60, the high priority secondary systems may be aggregated to an equivalent high priority secondary system, the low priority secondary systems may be aggregated to an equivalent low priority secondary system, the overlapping of the ranges to be protected (i.e. the extension of the ranges to be protected) of the high priority secondary systems may be taken as the range to be protected of the equivalent high priority secondary system, and the overlapping of the locating ranges (i.e. the extension of the locating ranges) of the low priority secondary systems may be taken as the locating range of the aggregated low priority secondary system.

Although FIG. 9 shows a case where a plurality of high priority secondary systems are aggregated to an equivalent high priority secondary system and a plurality of low priority secondary systems are aggregated to an equivalent low priority secondary system, the present disclosure is not limited hereto. As would be understood by those skilled in the art, the high/low priority secondary systems may be geographically aggregated to a plurality of equivalent high/low priority systems; for example, when two high/low priority secondary systems are not geographically close enough to each other, for example when a distance therebetween is greater than a certain threshold, the two high/low priority secondary systems may be respectively aggregated to different equivalent high/low priority systems.

At least one equivalent high priority secondary system and the range to be protected thereof as well as at least one equivalent low priority secondary system and the locating range thereof are obtained by aggregating the plurality of high priority secondary systems and the plurality of low priority secondary systems by the aggregation device 60, so the selection device 20 may select, with respect to each equivalent high priority system, the reference location for each low priority system including the equivalent low priority system in the locating thereof; and the parameter determination device 30 may determine the operational parameter of the equivalent low priority system for the equivalent high priority system based on the reference location of each low priority system including the equivalent low priority system, so as to determine the operational parameters of respective low priority secondary systems that are aggregated to the equivalent low priority secondary system based on the operational parameter of the equivalent low priority secondary system. According to the present disclosure, for example the determined transmission power PE of the equivalent low priority secondary system may be equally allocated to the respective low priority secondary systems that are aggregated to the equivalent low priority secondary system, that is, the transmission power PI of each low priority secondary system may be set to be equal to PI=PE/N, where N is a number of the low priority secondary systems that are aggregated to the equivalent low priority secondary system. Of course, the present disclosure is not limited hereto. The allocation of the transmission power to the respective equivalent low priority secondary systems may also be performed based on contribution ratios of the transmission power of the respective low priority secondary systems to the transmission power of the equivalent low priority secondary system.

In addition, although examples of aggregating both a plurality of low priority secondary systems and a plurality of high priority secondary systems are described above, the present disclosure is not limited hereto. As would be understood by those skilled in the art, in a case where the high priority system is the primary system and the low priority system is the secondary system, it is also possible to aggregate only a plurality of low priority systems that are geographically close to each other.

Although an example of the radio resource management system as shown in FIG. 1 that respectively further comprises a storage device, a communication device and an aggregation device is described above with reference to FIGS. 2, 7 and 8, two or all of the storage device 40, the communication device 50 and the aggregation device 60 according to the present disclosure may also be combined in any manner and be comprised in the radio resource management system as shown in FIG. 1. For example, the radio resource management system according to the present disclosure may comprise an acquisition device 10, a selection device 20, a parameter determination device 30, a storage device 40 and an aggregation device 60.

The configuration of the neighbor radio resource management system will be described below while considering the case where the low priority system managed by the neighbor radio management system generates the interference on the high priority system managed by the radio resource management system 1.

Figure 10:
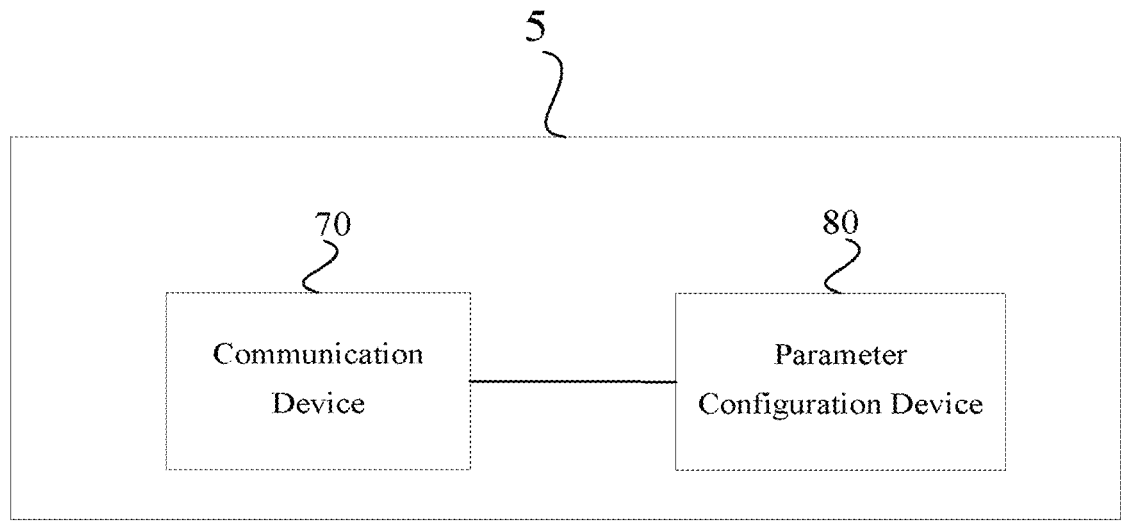
FIG. 10 is an exemplary structural block diagram showing a radio resource management system according to another embodiment of the present disclosure.

FIG. 10 is an exemplary structural block diagram showing a radio resource management system according to another embodiment of the present disclosure.

As shown in FIG. 10, a radio resource management system 5 comprises: a communication device 70, configured to send the location information of the low priority system managed by the radio resource management system to the neighbor radio resource management system and receive the operational parameter for the low priority system managed by the radio resource management system from the neighbor radio resource management system; and a parameter configuration device 80, configured to configure the current operational parameter of the corresponding low priority system managed by the radio resource management system as the operational parameter, wherein, the neighbor radio resource management system selects, with respect to each high priority system managed by the neighbor radio resource management system, the reference location for each low priority system within the uncertain range thereof based on the received location information of the low priority system managed by the radio resource management system, and determine the adjustment to the operational parameter of the low priority system based on the reference location of each low priority system, such that the use of the spectrum resource by the low priority system satisfies the interference requirement of the high priority system.

The neighbor radio resource management system according to an embodiment of the present disclosure may be the radio resource management systems 1-4 as shown in FIGS. 1-9.

According to an embodiment of the present disclosure, the radio resource management system 5 may manage the location information of the low priority system within its management range, and may exchange with another radio resource management system neighboring it the location information of the low priority systems managed by each other via the communication device 70. In addition, the communication device 70 may also receive the operational parameter for the low priority system managed by the radio resource management system from the neighbor radio resource management system. The operational parameter for example may be determined by the parameter determination device 30 as shown in FIGS. 1-9.

Figure 11:
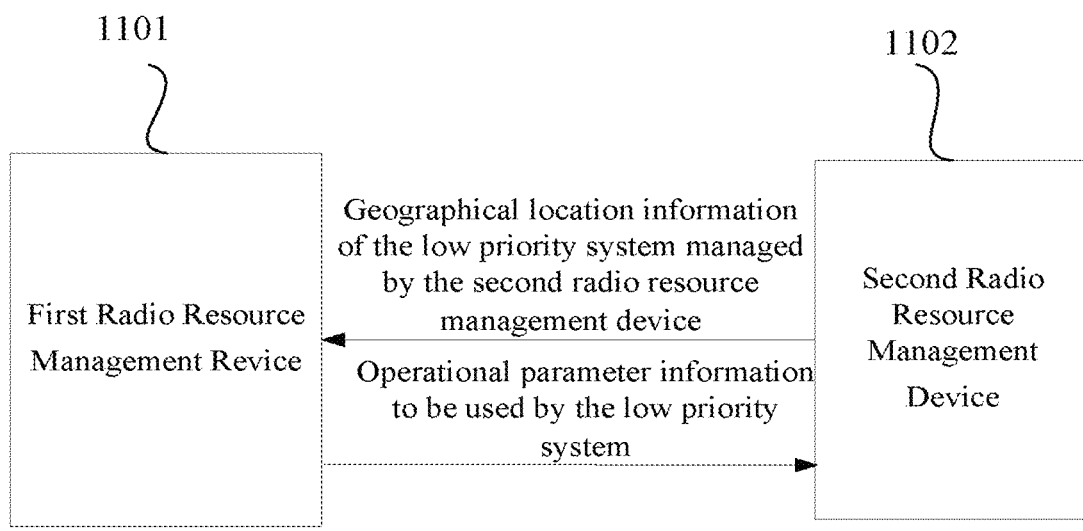
FIG. 11 is a schematic view showing information interaction between a radio resource management system according to an embodiment of the present disclosure and its neighbor radio resource management system.

FIG. 11 is a schematic view showing information interaction between a radio resource management system according to an embodiment of the present disclosure and its neighbor radio resource management system.

As shown in FIG. 11, a first radio resource management system 1101 receives the location information of the low priority system managed by a second radio resource management system 1102 from the second radio resource management system 1102, and the first radio resource management system 1101 sends the location information to the second radio resource management system 1102 as the operational parameter determined for each low priority system managed by the second radio resource management system 1102; the second radio resource management system 1102 receives the operational parameter of the low priority system managed by the second radio resource management system 1102 from the first radio resource management system 1101, and configures with the operational parameter the low priority system managed by it. For the processing of determining the operational parameter of the low priority system by the first radio resource management system 1101, whose detailed descriptions are omitted herein, reference may be made to the operations by the acquisition device 10, the selection device 20 and the parameter determination device 30 as shown in FIGS. 1-9.

According to one embodiment of the present disclosure, there is further provided a radio resource management method. One exemplary processing of the radio resource management method will be described below in combination with FIG. 12.

Figure 12:
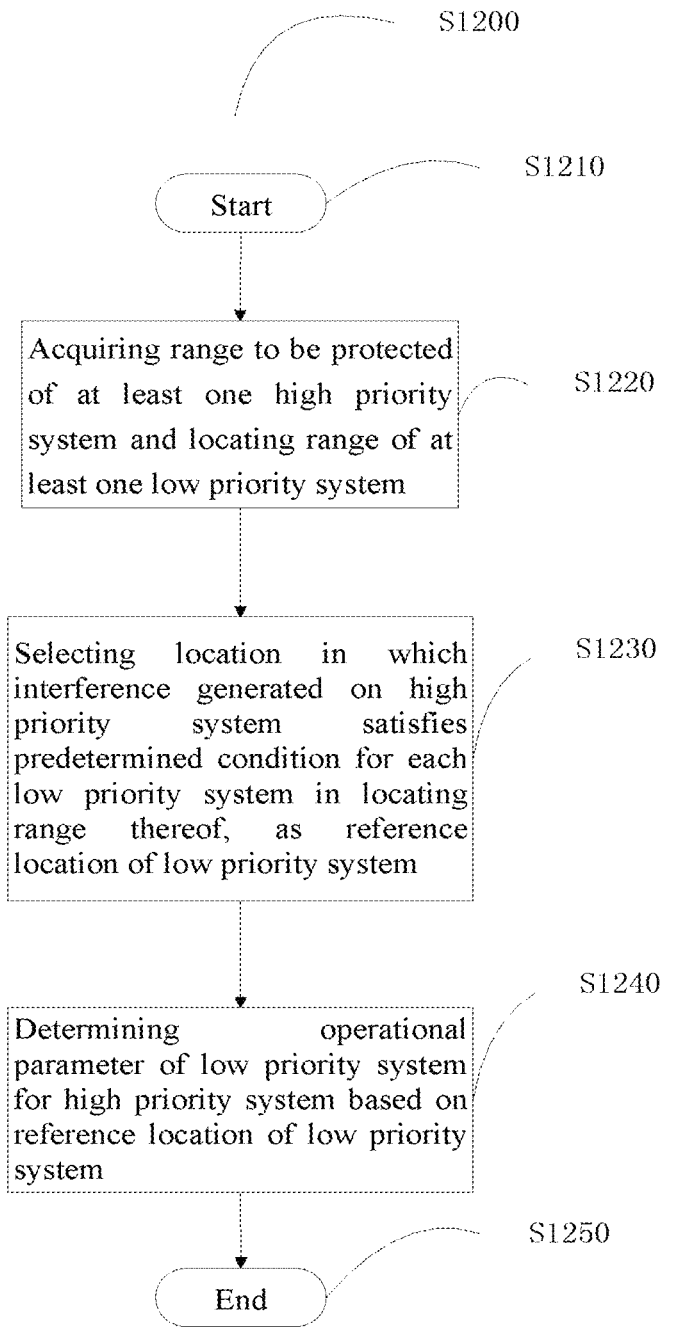
FIG. 12 is a flowchart schematically showing a radio resource management method according to an embodiment of the present disclosure.

As shown in FIG. 12, in the radio resource management method according to the embodiment of the present disclosure, processing flow 1200 starts from S1210, and then processing of S1220 is performed.

In S1220, the range to be protected of at least one high priority system managed by the radio resource management system is acquired and the locating range of at least one low priority system managed by the radio resource management system is acquired based on the location information of the at least one high priority system and the location information of the at least one low priority system, wherein, the high priority system has a higher priority than the low priority system with regard to the use of spectrum resource, and the low priority system opportunistically utilizes the spectrum resource. For S1220, whose detailed descriptions are omitted herein, reference may be made for example to the operation by the acquisition device 10 as shown in FIG. 1. Then S1230 is performed.

In step S1330, the location in which the interference generated on the high priority system satisfies a predetermined condition is selected, with respect to each high priority system among the at least one high priority system, for each low priority system in the locating range thereof, based on the range to be protected of the high priority system, as the reference location of the low priority system. For S1230, whose detailed descriptions are omitted herein, reference may also be made for example to the operation by the selection device 20 as shown in FIGS. 1-9. Then step S1240 is performed.

In step S1240, the operational parameter of the low priority system is determined for the high priority system based on the reference location of each low priority system. For S1230, whose detailed descriptions are omitted herein, reference may also be made for example to the operation by the parameter determination device 30 as shown in FIGS. 1-9. Then step S1250 is performed.

Processing flow 1200 ends with S1250.

According to the present disclosure, in step S1230, the reference location of each low priority system may be determined, with respect to each high priority system, based on at least one of the distances and path losses between respective low priority systems and the high priority system, and the environmental factors in relation to the environment that the radio resource management system is located in.

According to an embodiment of the present disclosure, step S1230 may comprise: judging, with respect to each high priority system, whether there is an obstruction between the locating range of respective low priority systems and the range to be protected of the high priority system or not; and selecting the reference location of the low priority system based on whether there is an obstruction and whether there is an overlapping between the locating range of respective low priority systems and the range to be protected of the high priority system or not.

More particularly, the reference location for each low priority system may be selected, with respect to each high priority system, based on one of the following way:
  (i) when there is no obstruction and overlapping between the locating range of the low priority system and the range to be protected of the high priority system or when the region between the locating range of the low priority system and the range to be protected of the high priority system is totally sheltered by an obstruction, selecting on the boundary of the locating range of the low priority system the location that is nearest to the boundary of the range to be protected of the high priority system as the reference location of the low priority system;
  (ii) when the region between the locating range of the low priority system and the range to be protected of the high priority system is partly sheltered by an obstruction and there is no overlapping therebetween, selecting in the locating range of the low priority system the location that is in line of sight with arbitrary point within the range to be protected of the high priority system and is nearest to the arbitrary point as the reference location of the low priority system;
  (iii) when the region between the locating range of the low priority system and the range to be protected of the high priority system is partly sheltered by an obstruction and there is an overlapping therebetween, if the sheltered portion can totally cover the overlapped part, selecting in the locating range of the low priority system the location that is in line of sight with arbitrary location within the range to be protected of the high priority system and is nearest to the arbitrary location as the reference location of the low priority system;
  (iv) when there is no obstruction between the locating range of the low priority system and the range to be protected of the high priority system and there is an overlapping therebetween or when the region between the locating range of the low priority system and the range to be protected of the high priority system is partly sheltered by an obstruction and there is an overlapping therebetween and the sheltered portion cannot totally cover the overlapped part, determining that the reference location of the low priority system is overlapped with the location of the high priority system.

According to a preferred embodiment of the present disclosure, in step S1230, in case that it is determined that the reference location of the low priority system is overlapped with the location of the high priority system, it is determined that the transmission power of the low priority system is zero.

According to the present disclosure, in step S1230, whether respective locations in the locating range of the low priority system is in line of sight with arbitrary location within the range to be protected of the high priority system or not may be determined according to antenna heights of the high priority system and the low priority system.

According to the present disclosure, in step S1240, the aggregate interference experienced by the high priority system may be calculated based on the reference location of each low priority system, and the operational parameter of the low priority system may be determined based on the aggregate interference.

According to an embodiment of the present disclosure, the high priority system is the high priority secondary system that opportunistically utilizes the spectrum resource, and the low priority system is the low priority secondary system that has a lower priority than the high priority secondary system with regard to the use of spectrum resource. In this case, step S1240 comprises: calculating, with respect to each high priority system, the aggregate interference experienced by respective locations within the range to be protected of the high priority system based on the reference location of each low priority system determined by the selection unit; and selecting the interference location of the high priority system within the range to be protected of the high priority system according to the aggregate interference, so as to determine the operational parameters of respective low priority systems based on the interference location of the high priority system. According to a preferred embodiment of the present disclosure, the location having the maximum aggregate interference within the range to be protected may be selected as the interference location of the high priority system.

According to another embodiment of the present disclosure, the high priority system is the primary system that has a normal use right of the spectrum resource, and the low priority system is the secondary system that opportunistically utilizes the spectrum resource.

According to yet another embodiment of the present disclosure, the high priority system is the primary system and the high priority secondary system, and the low priority system is the low priority secondary system, the parameter determination device is configured to determine the operational parameter of the low priority secondary system based on the reference location of each low priority secondary system, such that the use of the spectrum resource by the low priority system satisfies the interference requirements of the primary system and the high priority secondary system.

According to the present disclosure, step S1240 further comprises: determining, with respect to each high priority system of at least one high priority system, the operational parameter of each low priority system based on the reference location of each low priority system, and selecting the minimum transmission power from at least one operational parameter determined for each low priority system with respect to at least one high priority system, as the transmission power of the low priority system.

The radio resource management method according to the present disclosure further comprises: aggregating at least two high priority systems that are managed by the radio resource management system and are geographically close to each other to one high priority secondary system, aggregating at least two low priority systems that are managed by the radio resource management system and are geographically close to each other to one low priority secondary system, and taking the overlapping of the ranges to be protected of at least two high priority secondary systems as the range to be protected of the aggregated high priority secondary system, taking the overlapping of the locating ranges of at least two low priority secondary systems as the locating range of the aggregated low priority secondary system. Thus a calculation amount when determining the operational parameter of the low priority system is thus reduced.

According to one embodiment of the present disclosure, there is further provides an electronic device, comprising a processing circuit or one/more processor(s) configured to: acquire the range to be protected of at least one high priority system managed by the radio resource management system and acquire the locating range of at least one low priority system managed by the radio resource management system based on the location information of the at least one high priority system and the location information of the at least one low priority system, wherein, the high priority system has a higher priority than the low priority system with regard to the use of spectrum resource, and the low priority system opportunistically utilizes the spectrum resource; select, with respect to each high priority system among the at least one high priority system, the location in which the interference generated on the high priority system satisfies a predetermined condition for each low priority system in the locating range thereof based on the range to be protected of the high priority system, as the reference location of the low priority system; and determine the operational parameter of the low priority system for the high priority system based on the reference location of each low priority system.

The radio resource management system and the radio resource management system and the electronic device according to the present disclosure at least can produce the advantageous effect of: making it possible to greatly reduce a calculation amount when determining the operational parameter for each low priority system. Particularly, in the conventional spectrum sharing radio algorithm, it is necessary to determine the operational parameter of each low priority system based on respective locations in the range to be protected of each high priority system and each location in the locating range of each low priority system (in general, the number of the respective locations for calculation is larger in the case that the locating range is larger), while in the radio resource management system and the radio resource management system according to the present disclosure, it is only necessary to determine the operational parameter of each low priority system based on the reference location of each low priority system (i.e., one or more limited locations in the locating range). Thus according to the present disclosure, it is made possible to greatly reduce a calculation amount, thereby improving the operating efficiency of radio resource management when performing the operation of determining the operational parameter.

Examples of Application Scenarios

The radio resource management system according to the embodiment of the present disclosure is applicable to application scenarios where the primary system is a terrestrial television broadcast system and the secondary system is a cognitive radio communication system.

The respective constituent units, sub-units and the like in the radio resource management system according to the embodiment of the present disclosure may be configured by software, firmware, hardware or any combination thereof. In the case of implementation by software or firmware, a program constituting the software or firmware may be installed from a storage medium or a network to a machine having a dedicated hardware structure. When installed with various programs, the machine can implement various functions of the respective constituent units and sub-units.

Figure 13:
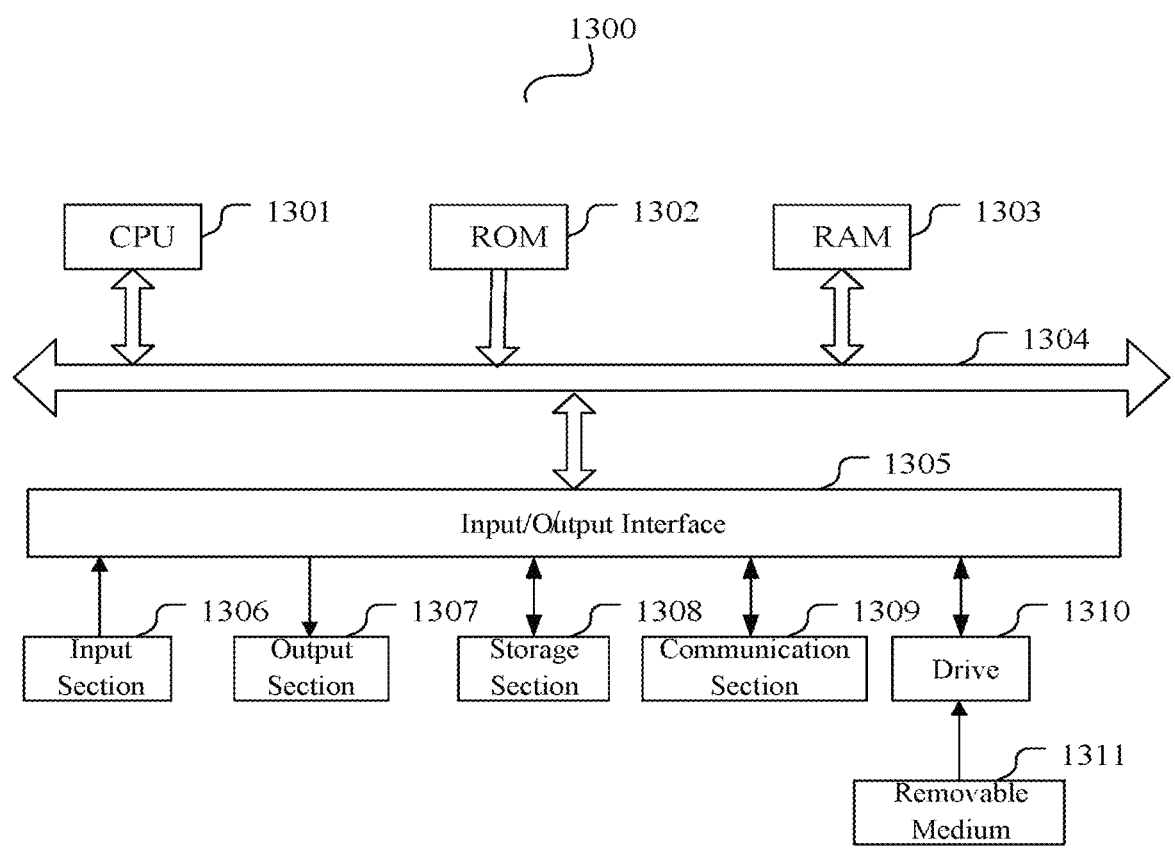
FIG. 13 is a simple structural diagram showing hardware configuration of one possible information processing apparatus which can be used for realizing a radio resource management system and a radio resource management method according to an embodiment of the present disclosure.

FIG. 13 is a simple structural diagram showing hardware configuration of one possible information processing apparatus which can be used for realizing a radio resource management system and a radio resource management method according to an embodiment of the present disclosure.

In FIG. 13, a central processing unit (CPU) 1301 executes various processing according to a program stored in a read-only memory (ROM) 1302 or a program loaded from a storage section 1308 to a random access memory (RAM) 1303. In the RAM 1303, data needed when the CPU 1301 executes various processing and the like shall also be stored according to requirements. The CPU 1301, the ROM 1302 and the RAM 1303 are connected to each other via a bus 1304. An input/output interface 1305 is also connected to the bus 1304.

The following components are also connected to the input/output interface 1305: an input section 1306 (including a keyboard, a mouse and the like), an output section 1307 (including a display, such as a Cathode Ray Tube (CRT), a Liquid Crystal Display (LCD) and the like, as well as a loudspeaker and the like), a storage section 1308 (including a hard disc and the like), and a communication section 1309 (including a network interface card such as an LAN card, a modem and so on). The communication section 1309 performs communication processing via a network such as the Internet. According to requirements, a drive 1310 may also be connected to the input/output interface 1305. A removable medium 1311 such as a magnetic disc, a compact disc, a magnetooptic disc, a semiconductor memory and the like may be installed on the drive 1310 according to requirements, such that a computer program read therefrom may be installed into the storage section 1308 according to requirements.

In the case of carrying out the foregoing series of processing by software, a program constituting the software may be installed from a network such as the Internet or a storage medium such as the removable medium 1311.

It should be understood by those skilled in the art that such a storage medium is not limited to the removable medium 1311 storing therein a program and distributed separately from an apparatus to provide a program to a user as shown in FIG. 13. Examples of the removable medium 1311 include a magnetic disc (including a floppy disc), a compact disc (including a compact disc read-only memory (CD-ROM) and a digital versatile disc (DVD)), a magnetooptic disc (including a mini disc (MD) (registered trademark)) and a semiconductor memory. Or, the storage medium may be a hard disc and the like included in the ROM 1302 and the storage section 1308, in which programs are stored and which are distributed concurrently with the apparatuses including them to users.

In addition, the present disclosure further proposes a program product storing a machine-readable instruction code. When being read and executed by a machine, the instruction code can carry out an uplink data transmission method and transmission manner configuration method according to an embodiment of the present disclosure. Correspondingly, various storage media for carrying the program product, such as a magnetic disc, a compact disc, a magnetooptic disc, a semiconductor memory and the like, are also included in the present disclosure.

In the foregoing descriptions of the detailed embodiments of the present disclosure, features described and/or shown with respect to one embodiment may be used in one or more other embodiments according to an identical or similar way, and are combined with features in the other embodiments or substitute the features in the other embodiments.

In addition, the methods according to various embodiments of the present disclosure are not limited to be implemented in the temporal orders as described in the specification or as shown in the drawings, but may also be implemented in other temporal orders, concurrently or independently. Thus the orders of implementing the methods as described in the present description do not constitute limitations to the technical scope of the present disclosure.

In addition, the respective operation processes of the foregoing methods according to the present disclosure obviously may also be implemented by computer-executable programs stored in various machine-readable storage media.

Besides, the object of the present disclosure may also be realized by: directly or indirectly providing the foregoing storage media storing the executable program code to a system or an apparatus, and reading and executing the program code by a computer or a central processing unit (CPU) in the system or the apparatus.

In this case, as long as the system or the apparatus has a function of executing a program, the implementation according to the present disclosure is not limited to a program, and the program may be in any form, such as a target program, a program executed by an interpreter, or a script program provided to an operation system, or the like.

The foregoing machine-readable storage media include but are not limited to: various memories and storage units, semiconductor devices, magnetic disc units such as compact, magnetic and magnetooptic discs, and any other media adapted for storing information and the like.

Finally, it should also be noted that in the present disclosure, the relational terms such as "left" and "right", "first" and "second" and the like are used only to distinguish one entity or operation from another entity or operation, without necessarily requiring or suggesting existence of any such actual relation or order between these entities or operations. Besides, the term "comprise", "include" or any other variant intends to cover non-exclusive inclusion, such that a process, a method, an article or a device including a series of elements not only includes those elements but also includes other elements not explicitly listed, or further includes elements intrinsic to such process, process, article or device. In addition, in the absence of more limitations, elements defined by the expression "including one . . . " do not exclude other identical elements existing in the process, method, article or device including the elements.

Although the present disclosure has been described above in combination with the descriptions of the detailed embodiments of the present disclosure, it should be understood that those skilled in the art can carry out various modifications, improvements or equivalents for the above embodiments within the spirit and scope of the appended claims. Such modifications, improvements or equivalents should also be regarded as being included within the scope of protection of the present disclosure.

The invention claimed is:

1. A radio resource management system, comprising:
a processing circuitry configured to:
acquire a range to be protected of a high priority system managed by the radio resource management system and acquire a locating range of a low priority system managed by the radio resource management system based on location information of the high priority system and location information of the low priority system, wherein, the high priority system has a higher priority than the low priority system with regard to a use of spectrum resource, and the low priority system opportunistically utilizes the spectrum resource;
select, for the low priority system, with respect to the high priority system, a location in the locating range of the low priority system in which interference generated on the high priority system at a location of the high priority system at which the interference is a maximum satisfies a predetermined condition based on the range to be protected of the high priority system, as a reference location of the low priority system; and
determine, for the low priority system, with respect to the high priority system an operational parameter of the low priority system with regard to the use of the spectrum of the high priority system based on the reference location of the low priority system, wherein the high priority system being one of at least one high priority systems, and the low priority system being one of at least one low priority systems, wherein
the high priority system is a high priority secondary system that opportunistically utilizes the spectrum resource, and the low priority system is a low priority secondary system that has a lower priority than the high priority secondary system with regard to the use of the spectrum resource,
the high priority secondary system, the low priority secondary system, and a primary system have a three tier priority level: the primary system has a first priority in using the spectrum resource, the high priority secondary system has a second priority in using the spectrum resource, and the low priority secondary system has a third priority in using the spectrum resource, and in response to a determination by the processing circuitry that the reference location of the low priority system is overlapped with the location of the high priority system, the processing circuitry is configured to determine that a transmission power of the low priority system is zero.

2. The radio resource management system according to claim 1, wherein, the processing circuitry is configured to determine, with respect to the high priority system, the reference location of the low priority system based on at least one of distances and path losses between respective low priority systems and the high priority system, and environmental factors in relation to an environment that the radio resource management system is located in.

3. The radio resource management system according to claim 2, wherein, the processing circuitry is configured to:
   judge, with respect to the high priority system, whether there is an obstruction between the locating range of respective low priority systems and the range to be protected of the high priority system or not; and
   select the reference location of the low priority system based on whether there is the obstruction and whether there is an overlapping between the locating range of respective low priority systems and the range to be protected of the high priority system or not.

4. The radio resource management system according to claim 3, wherein, the processing circuitry selects, with respect to the high priority system, the reference location for the low priority system based on one of the following way:
   (i) when no obstruction exists and no overlapping of ranges exists between the locating range of the low priority system and the range to be protected of the high priority system or when the region between the locating range of the low priority system and the range to be protected of the high priority system is totally sheltered by an obstruction, selecting on the boundary of the locating range of the low priority system the location that is nearest to the boundary of the range to be protected of the high priority system as the reference location of the low priority system;
   (ii) when the region between the locating range of the low priority system and the range to be protected of the high priority system is partly sheltered by an obstruction and there is no overlapping therebetween, selecting in the locating range of the low priority system the location that is in line of sight with arbitrary point within the range to be protected of the high priority system and is nearest to the arbitrary point as the reference location of the low priority system:
   (iii) when the region between the locating range of the low priority system and the range to be protected of the high priority system is partly sheltered by an obstruction and there is an overlapping therebetween, if the sheltered portion can totally cover the overlapped part, selecting in the locating range of the low priority system the location that is in line of sight with arbitrary location within the range to be protected of the high priority system and is nearest to the arbitrary location as the reference location of the low priority system:
   (iv) when there is no obstruction between the locating range of the low priority system and the range to be protected of the high priority system and there is an overlapping therebetween or when the region between the locating range of the low priority system and the range to be protected of the high priority system is partly sheltered by an obstruction and there is an overlapping therebetween and the sheltered portion cannot totally cover the overlapped part, determining that the reference location of the low priority system is overlapped with the location of the high priority system.

5. The radio resource management system according to claim 3, wherein, whether respective locations in the locating range of the low priority system is in line of sight with arbitrary location within the range to be protected of the high priority system or not is determined according to antenna heights of the high priority system and the low priority system.

6. The radio resource management system according to claim 1, wherein, the processing circuitry is configured to calculate an aggregate interference experienced by the high priority system based on the reference location of the low priority system, and determine the operational parameter of the low priority system based on the aggregate interference.

7. The radio resource management system according to claim 1, wherein, the processing circuitry is configured to:
   calculate, with respect to the high priority system, the aggregate interference experienced by respective locations within the range to be protected of the high priority system based on the reference location of the low priority system; and
   select the interference location of the high priority system within the range to be protected of the high priority system according to the aggregate interference, so as to determine the operational parameters of respective low priority systems based on the interference location of the high priority system.

8. The radio resource management system according to claim 7, wherein, the processing circuitry selects the location having a maximum aggregate interference within the range to be protected as the interference location of the high priority system.

9. The radio resource management system according to claim 1, wherein, the low priority system opportunistically utilizes the spectrum resource.

10. The radio resource management system according to claim 1, wherein, the processing circuitry is configured to determine the operational parameter of the low priority secondary system based on the reference location of the low priority secondary system, such that the use of the spectrum resource by the low priority system satisfies the interference requirements of the primary system and the high priority secondary system.

11. The radio resource management system according to claim 1, wherein, the low priority system comprises one of the low priority system managed by the radio resource management system and a low priority system managed by a neighbor radio resource management system,
   wherein, the processing circuitry is further configured to receive the location information of the low priority system managed by the neighbor radio resource management system from the neighbor radio resource management system, and send the determined operational parameter to the neighbor radio resource management system and the low priority system managed by the radio resource management system.

12. The radio resource management system according to claim 1, wherein, the processing circuitry is configured to determine, with respect to the high priority system, the operational parameter of the low priority system based on the reference location of the low priority system, and select a minimum transmission power from at least one operational parameter determined for the low priority system with respect to the high priority system, as a transmission power of the low priority system.

13. The radio resource management system according to claim 1, wherein, the processing circuitry is configured to aggregate at least two high priority secondary systems that are managed by the radio resource management system and are geographically close to each other to one high priority secondary system, aggregate at least two low priority secondary systems that are managed by the radio resource management system and are geographically close to each other to one low priority secondary system, take the overlapping of the ranges to be protected of the at least two high priority secondary systems as the range to be protected of the aggregated high priority secondary system, and take the overlapping of the locating ranges of the at least two low priority secondary systems as the locating range of the aggregated low priority secondary system.

14. The radio resource management system according to claim 1, wherein, the processing circuitry is configured to determine the operational parameter of the low priority system based on the reference location of the low priority system when the reference location of the low priority system goes beyond the locating range.

15. A radio resource management system, comprising:
a communication device, configured to send a location information of a low priority system managed by the radio resource management system to a neighbor radio resource management system and receive an operational parameter for the low priority system managed by the radio resource management system from the neighbor radio resource management system the operational parameter being set with regard to a use of the spectrum of the high priority system based on the reference location of the low priority system; and
a parameter configuration device, configured to configure the current operational parameter of the corresponding low priority system managed by the radio resource management system as the operational parameter,
wherein, the neighbor radio resource management system selects, for the low priority system, with respect to the high priority system managed by the neighbor radio resource management system, a reference location in the locating range of the low priority system in which interference generated on the high priority system at a location of the high priority system at which the interference is a maximum satisfies a predetermined condition, for the low priority system within an uncertain range thereof based on the received location information of the low priority system managed by the radio resource management system, and determine an adjustment to the operational parameter of the low priority system based on the reference location of the low priority system, such that use of a spectrum resource by the low priority system satisfies an interference requirement of the high priority system,
the high priority system is a high priority secondary system that opportunistically utilizes the spectrum resource, and the low priority system is a low priority secondary system that has a lower priority than the high priority secondary system with regard to the use of the spectrum resource,
the high priority secondary system, the low priority secondary system, and a primary system have a three tier priority level: the primary system has a first priority in using the spectrum resource, the high priority secondary system has a second priority in using the spectrum resource, and the low priority secondary system has a third priority in using the spectrum resource, and
in response to a determination by the neighbor radio resource management system that the reference location of the low priority system is overlapped with the location of the high priority system, the parameter configuration device is configured to determine that a transmission power of the low priority system is zero.

16. A radio resource management method for a radio resource management system, comprising:
acquiring a range to be protected of the high priority system managed by the radio resource management system and acquiring a locating range of the low priority system managed by the radio resource management system based on location information of the high priority system and location information of the low priority system, wherein, the high priority system has a higher priority than the low priority system with regard to a use of spectrum resource, and the low priority system opportunistically utilizes the spectrum resource;
selecting, for the low priority system, with respect to the high priority system, a location in the locating range of the low priority system in which interference generated on the high priority system at a location of the high priority system at which the interference is a maximum satisfies a predetermined condition based on the range to be protected of the high priority system, as a reference location of the low priority system; and
determining, for the low priority system, with respect to the high priority system, an operational parameter of the low priority system with regard to the use of the spectrum of the high priority system based on the reference location of the low priority system, wherein
the high priority system is a high priority secondary system that opportunistically utilizes the spectrum resource, and the low priority system is a low priority secondary system that has a lower priority than the high priority secondary system with regard to the use of the spectrum resource,
the high priority secondary system, the low priority secondary system, and a primary system have a three tier priority level: the primary system has a first priority in using the spectrum resource, the high priority secondary system has a second priority in using the spectrum resource, and the low priority secondary system has a third priority in using the spectrum resource, and
in response to a determination that the reference location of the low priority system is overlapped with the location of the high priority system, it is determined that a transmission power of the low priority system is zero.

* * * * *